(12) United States Patent
Kaliteevskiy et al.

(10) Patent No.: US 11,804,908 B2
(45) Date of Patent: Oct. 31, 2023

(54) PHOTON NUMBER RESOLVING DETECTOR SYSTEMS USING QUANTUM MEMORIES

(71) Applicant: CORNING INCORPORATED, Corning, NY (US)

(72) Inventors: Nikolay Alekseyevich Kaliteevskiy, Saint-Petersburg (RU); Michal Mlejnek, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/632,260

(22) PCT Filed: Jul. 30, 2020

(86) PCT No.: PCT/US2020/044161
§ 371 (c)(1),
(2) Date: Feb. 2, 2022

(87) PCT Pub. No.: WO2021/025932
PCT Pub. Date: Feb. 11, 2021

(65) Prior Publication Data
US 2022/0278757 A1 Sep. 1, 2022

Related U.S. Application Data

(60) Provisional application No. 62/884,302, filed on Aug. 8, 2019.

(51) Int. Cl.
*H04B 10/70* (2013.01)
(52) U.S. Cl.
CPC .................................... *H04B 10/70* (2013.01)
(58) Field of Classification Search
CPC ..................................................... H04B 10/70
(Continued)

(56) References Cited

U.S. PATENT DOCUMENTS

| 7,502,476 B1 | 3/2009 | Trifonov et al. |
| 9,071,425 B2 | 6/2015 | Yuan et al. |

(Continued)

FOREIGN PATENT DOCUMENTS

| CN | 114531226 A | * | 5/2022 | |
| WO | WO-2005094285 A2 | * | 10/2005 | ........... A61B 5/0071 |
| WO | WO-2011073656 A1 | * | 6/2011 | ............. B82Y 10/00 |

OTHER PUBLICATIONS

Fitch et al; photon-number resolution using time-multiplexed single-photon detectors; Oct. 2003; physical review; pp. 1-6. (Year: 2003).*

(Continued)

*Primary Examiner* — Amritbir K Sandhu
(74) *Attorney, Agent, or Firm* — Svetlana Z. Short (57) ABSTRACT

A photon number resolving detector system includes a photon source positioned at an input end, first and second photon detectors positioned at a detection end, and a plurality of optical couplers positioned between the input and detection ends. The plurality of optical couplers include an initial optical coupler optically coupled to the photon source, a final optical coupler optically coupled to the first and second photon detectors, and intermediate optical couplers positioned between the initial optical coupler and the final optical coupler. A first input link is optically coupled to the photon source and the initial optical coupler and a plurality of dual path spans are optically coupled to adjacent optical couplers. The plurality of dual path spans each include an undelayed path having an undelayed fiber link and a delayed path having a quantum memory positioned between and optically coupled to input and output sub-links.

18 Claims, 2 Drawing Sheets

(58) Field of Classification Search
USPC ........................................................ 398/140
See application file for complete search history.

(56) References Cited

U.S. PATENT DOCUMENTS

| | | | |
|---|---|---|---|
| 9,143,266 B2 | 9/2015 | Mower et al. | |
| 9,270,385 B2* | 2/2016 | Meyers | H04B 10/70 |
| 9,401,766 B2 | 7/2016 | Yuan et al. | |
| 11,290,192 B2 | 3/2022 | Kaliteevskiy et al. | |
| 2016/0139036 A1* | 5/2016 | Babin | G01N 21/274 |
| | | | 356/408 |
| 2018/0322921 A1 | 11/2018 | Brown et al. | |
| 2018/0331826 A1 | 11/2018 | Kaliteevskiy et al. | |
| 2019/0013878 A1* | 1/2019 | Paraiso | G02B 6/12007 |
| 2021/0194682 A1* | 6/2021 | Rhee | H04B 10/64 |

OTHER PUBLICATIONS

Castelletto et al; (Reduced Deadtime and Higher Rate Photon-Counting Detection using a Multiplexed Detector Array ; Jul. 2005 ; Journal of Modern Optics; pp. 1-12. (Year: 2005).*

Leo et al; two-photon interference at telecom wavelengths for time-bin-encoded single photons from quantum-dot spin qubits; Nov. 2015; nature communications; pp. 1-10. (Year: 2015).*

Fitch et al., "Photon number resolution using a time-multiplexed single-photon detector", Cornell University Library, May 30, 2003, 6 pages.

Gupta et al., "Preserving photon qubits in an unknown quantum state with Knill Dynamical Decoupling—Towards an all optical quantum memory", Cornell University Library, Dec. 19, 2014, 8 pages.

International Search Report and Written Opinion of the International Searching Authority; PCT/US2020/044161; dated Dec. 14, 2020; 12 pages; European Patent Office.

Wang et al., "Efficient quantum memory for single-photon polarization qubits", In Nature Photonics, vol. 13, No. 5, Mar. 4, 2019, 8 pages.

Achilles et al., "Photon number resolving detection using time-multiplexing," Quantum Electronics Conference, 2004 (IQEC) IThD3, International, 2008, 21 pages.

Gisin et al., "Multimode quantum memory based on atomic frequency combs", Phys. Rev. A 79, 052329 (2009), 10 pages.

Gisin et al., "Analysis of a quantum memory for photons based on controlled reversible inhomogeneous broadening", Phys. Rev. A 75, 032327 (2007).

Milburn et al., "A scheme for efficient quantum computation with linear optics", Nature (London) 409, 46 (2001), 18 pages.

Moiseev et al., "Broadband Multiresonator Quantum Memory-Interface", Scientific Reports 8:3982 (2018), 8 pages.

Polyakov et al., "Invited Review Article: Single-photon sources and detectors", Review of Scientific Instruments 82, 071101 (2011).

Sangouard et al., "Quantum Repeaters Based on Atomic Ensembles and Linear Optics"; Review of Modern Physics, vol. 83 Jan.-Mar. 2011; pp. 33-80.

Sellars et al., "Measurement of the ground-state hyperfine coherence time of $Eu3+151:Y2SiO5$", J. Opt. Soc. Am. B , vol. 24, Issue 9, 2007, pp. 2479-2482.

* cited by examiner

PHOTON NUMBER RESOLVING DETECTOR SYSTEMS USING QUANTUM MEMORIES

CROSS-REFERENCE TO RELATED APPLICATION

This application claims the benefit of priority under 35 U.S.C. § 371 of International Application No. PCT/US2020/044161, filed on Jul. 30, 2020, which claims the benefit of priority under 35 U.S.C. § 119 of U.S. Provisional Application Ser. No. 62/884,302 filed on Aug. 8, 2019, the content of which is relied upon and incorporated herein by reference in its entirety.

BACKGROUND

Field

The present specification generally relates to photon number resolving detector systems. More specifically, the present disclosure relates to photon number resolving detector systems using quantum memories.

Technical Background

Photon-number resolving detectors are detectors that can detect the actual number of individual photons in a photon pulse. The development of photon-number-resolving detectors is important for many applications in quantum-information systems, such as quantum computation using linear optics and quantum communication. One example photon-number resolving detector is a space division photon-number-resolving detector, in which a signal is divided into many spatial channels, each of which is terminated by a single-photon detector. One drawback of space division photon-number-resolving detectors is that they require a large number of single photon detectors.

Another example photon-number resolving detector is a time-multiplexing detector, which uses two-single photon detectors. Time-multiplexing detectors include pairs of single-mode optical fibers, where one optical fiber of the pair has an increased length at each subsequent stage of the time multiplexing detector. An example time-multiplexing detector is described in D. Achilles et al., "Photon number resolving detection using time-multiplexing," Quantum Electronics Conference, 2004 (IQEC) IThD3, International, 2008. However, current time-multiplexing detectors rely on increased lengths of fibers segments, which cause increased photon attenuation, reducing the reliability of the photon measurements at the single photon detectors and increasing the overall size of time-multiplexing detectors.

Accordingly, a need exists for an alternative, improved photon number resolving detector that facilitates a reduction in photon attenuation while having a reduced overall size.

SUMMARY

According to a first aspect of the present disclosure, a photon number resolving detector system includes a photon source positioned at an input end, a first photon detector and a second photon detector each positioned at a detection end, and a plurality of optical couplers positioned between the input end and the detection end. The plurality of optical couplers include an initial optical coupler optically coupled to the photon source, a final optical coupler optically coupled to the first photon detector and the second photon detector, and one or more intermediate optical couplers positioned between the initial optical coupler and the final optical coupler. The photon number resolving detector also includes a first input link optically coupled to and extending between the photon source and the initial optical coupler and a plurality of dual path spans extending between and optically coupled to adjacent optical couplers. The plurality of dual path spans each include an undelayed path having an undelayed fiber link and a delayed path having a quantum memory positioned between and optically coupled to an input sub-link and an output sub-link.

A second aspect includes the photon number resolving detector system of the first aspect, wherein the plurality of optical couplers are fused fiber optic couplers.

A third aspect includes the photon number resolving detector system of the first aspect or the second aspect, further including a first output link optically coupled to and extending between the final optical coupler and the first photon detector and a second output link optically coupled to and extending between the final optical coupler and the second photon detector.

A fourth aspect includes the photon number resolving detector system of the third aspect, wherein the first input link, the first output link, the second output link and the undelayed fiber link, the input sub-link, and the output sub-link of each of the plurality of dual path spans are optical fibers.

A fifth aspect includes the photon number resolving detector system of any of the previous aspects, wherein the plurality of optical couplers each have a 50:50 coupling ratio.

A sixth aspect includes the photon number resolving detector system of any of the previous aspects, wherein the first photon detector and the second photon detector each are a single photon detector.

A seventh aspect includes the photon number resolving detector system of the sixth aspect, wherein the single photon detector includes a superconducting nanowire single-photon detector, a carbon nanowire detector, an avalanche photodiode detector, or a low dark count photodiode.

An eighth aspect includes the photon number resolving detector system of any the previous aspects, further including a second input link optically coupled to the initial optical coupler, wherein the second input link has a dead end opposite the initial optical coupler.

According to a ninth embodiment of the present disclosure, a method of counting photons of a photon pulse includes directing a photon pulse sequence including a plurality of photons from a photon source into an initial optical coupler, wherein the initial optical coupler is optically coupled to a first dual path span of a plurality of dual path spans, the plurality of dual path spans each include an undelayed path having an undelayed fiber link and a delayed path having a quantum memory positioned between and optically coupled to an input sub-link and an output sub-link, and the initial optical coupler directs a first portion of photon pulses of the photon pulse into the undelayed fiber link and directs a second portion of photon pulses of the photon pulse into the input sub-link of the delayed path. The method also includes delaying the second portion of photon pulses using the quantum memory of the first dual path span, receiving the plurality of photons of the photon pulse at a final optical coupler optically coupled to a first photon detector and a second photon detector such that the final optical coupler directs each of the plurality of photons of the photon pulse toward the first photon detector or the second photon detector, and counting each photon received by the first photon detector and the second photon detector.

A tenth aspect includes the method of the ninth aspect, wherein a first input link extends between the photon source and the initial optical coupler such that the photon pulse is directed from the photon pulse through the first input link and into the initial optical coupler.

An eleventh aspect includes the method of the tenth aspect, wherein a second input link is optically coupled to the initial optical coupler and has a dead end opposite the initial optical coupler.

A twelfth aspect includes the method of any of the ninth through the eleventh aspects, wherein a first output link extends between the final optical coupler and the first photon detector and a second output link extends between the final optical coupler and the second photon detector.

A thirteenth aspect includes the method of any of the ninth through the twelfth aspect, wherein the initial optical coupler and the final optical coupler each have a 50:50 coupling ratio.

A fourteenth aspect includes the method of any of the ninth through the thirteenth aspects, wherein delaying the second portion of photon pulses using the quantum memory includes absorbing the second portion of photon pulses using the quantum memory, thereby exciting an atomic ensemble state of the quantum memory from a first energy state into a second energy state and, upon return of the atomic ensemble state of the quantum memory to the first energy state, releasing, from the quantum memory, the second portion of photon pulses.

A fifteenth aspect includes the method of any of the ninth through the fourteenth aspects, wherein the initial optical coupler and the final optical coupler are two of a plurality of optical couplers, the plurality of optical couplers further including one or more intermediate optical couplers positioned between the initial optical coupler and the final optical coupler and the plurality of dual path spans are alternately positioned between the plurality of optical couplers such that each dual path span extends between and is optically coupled to two optical couplers of the plurality of optical couplers.

A sixteenth aspect include the method of the fifteenth aspect, wherein the first dual path span is positioned between and optically coupled to the initial optical coupler and a first intermediate optical coupler and the quantum memory of the first dual path span includes a first quantum memory, a second dual path span is positioned between and optically coupled to the first intermediate optical coupler and a second intermediate optical coupler and includes a second quantum memory, and an $N_{TH}$ dual path span is positioned between and optically coupled to an additional optical coupler and the final optical coupler and includes an $N_{TH}$ quantum memory.

A seventeenth aspect includes the method of the sixteenth aspect, further including delaying photons a quantum memory period at each of the plurality of dual path spans.

An eighteenth aspect includes the method of the seventeenth aspect, wherein the first quantum memory includes a quantum memory period $T_{QM1}$, the second quantum memory includes a second quantum memory period $T_{QM2}$, the $N_{TH}$ quantum memory includes an $N_{TH}$ quantum memory period $T_{QMN}$, $T_{QM2}=2T_{QM1}$, and $T_{QMN}=2^{(N-1)}T_{QM1}$.

A nineteenth aspect includes the method of any of the ninth through eighteenth aspects, wherein the first photon detector and the second photon detector each have a detector dead time, temporally adjacent photons received by the first photon detector are spaced apart by at least a delayed spacing period, temporally adjacent photons received by the second photon detector are spaced apart by at least the delayed spacing period, and the delayed spacing period is greater than the detector dead time.

A twentieth aspect includes the method of the nineteenth aspect, wherein the delayed spacing period is greater than or equal to a quantum memory period of the quantum memory of the first dual path span.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in detail to embodiments of photon number resolving detector systems that include quantum memories for use in quantum communications processes, examples of which are illustrated in the accompanying drawings. Whenever possible, the same reference numerals will be used throughout the drawings to refer to the same or like parts. The photon number resolving detector systems described herein include a plurality of optical couplers and a plurality of dual path spans alternately positioned between a photon source and two photon detectors. The plurality of dual path spans include an undelayed path having an undelayed fiber link extending between two optical couplers and a delayed path that includes a quantum memory. The quantum memory applies a delay to photon pulses that reach the quantum memory, which facilitates time-division multiplexing without the need for increased optical fiber lengths. This reduction of optical fiber lengths reduces photon attenuation in the photon number resolving detector, thereby increasing the efficiency of the photon number resolving detector system, reducing the overall size of the photon number resolving detector system, and allowing the use of photon detectors having a higher detector dead time.

Figure 1:
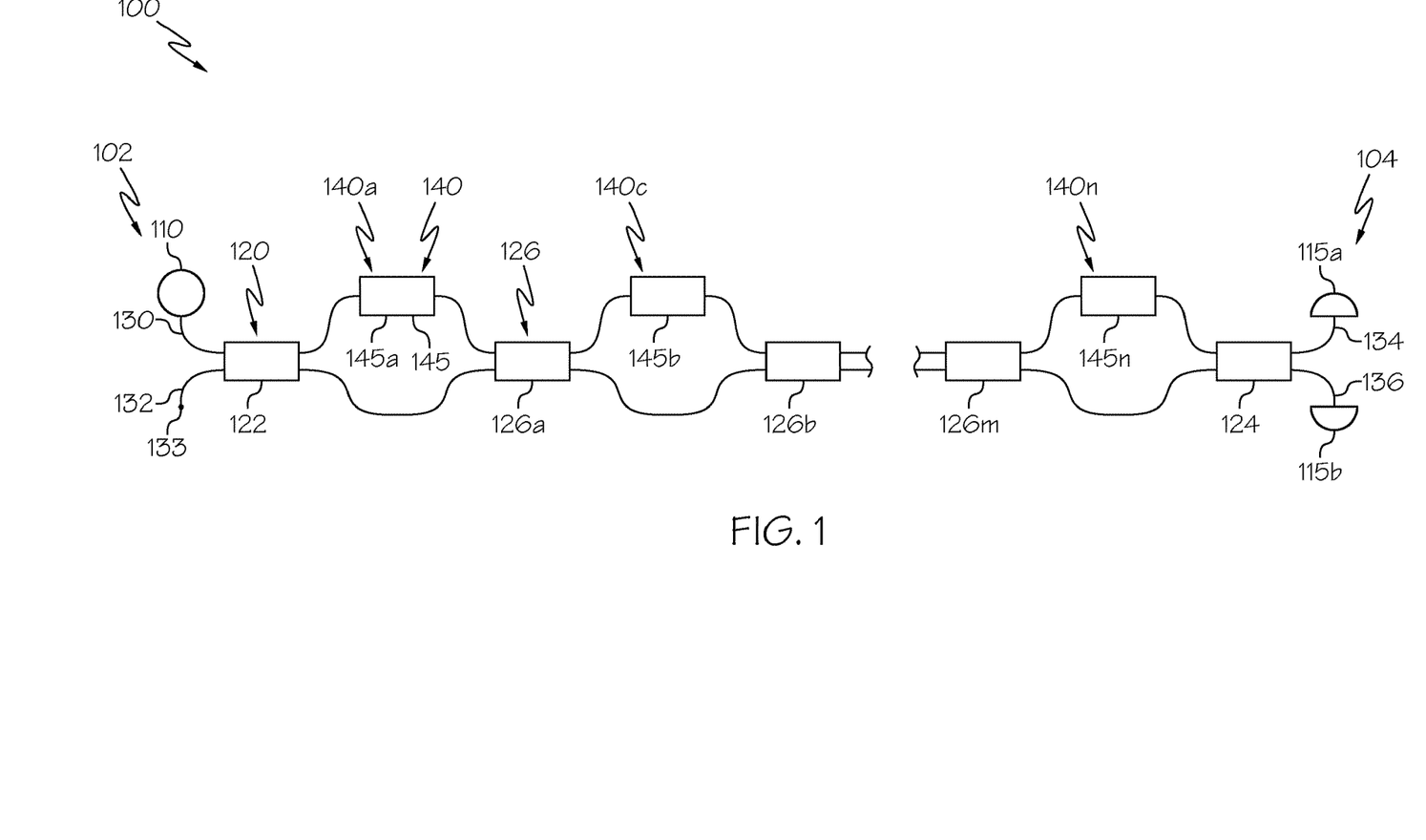
FIG. 1 schematically depicts a photon number resolving detector system, according to one or more embodiments shown and described herein.

Referring now to FIG. 1, a photon number resolving detector system 100 is schematically depicted. The photon number resolving detector system 100 comprises an input end 102 and a detection end 104. A photon source 110 is positioned at the input end 102 and a first photon detector 115a and a second photon detector 115b are each positioned at the detection end 104. The photon source 110 may comprise a photon generator structurally configured to generate and output one or more photon pulses, for example, a photon pulse sequence comprising a plurality of photon pulses, which may comprise any single wavelength λ. In some embodiments, for example, embodiments in which the photon source 110 comprises a laser source the wavelength λ may comprise from 800 nm to 1800 nm, such as 800 nm, 1310 nm, 1550 nm, or the like. For example, the photon source 110 may comprise a laser source. In other embodiments, the wavelength λ may be in the radio spectrum range, for example from 1 mm to 1 km, which includes the microwave spectrum of from 1 mm to 1 m.

In some embodiments, the first photon detector 115a and the second photon detector 115b each comprise a single photon detector, such as a superconducting nanowire single photon detector, a carbon nanowire detector, an avalanche photodiode detector, a low dark count photodiode detector, or the like. Further, the frequency at which the first photon detector 115a and the second photon detector 115b may measure (e.g., count) individual photons of a photon pulse sequence is limited by detector dead time. As used herein, "detector dead time" refers to a recovery period of an individual photon detector between detection events, during which the photon detector cannot detect other photon pulses. As described below, the photon number resolving detector system 100 is configured to mitigate detector dead time issues to facilitate precise photon measurements by the first photon detector 115a and the second photon detector 115b.

Referring still to FIG. 1, the photon number resolving detector system 100 comprises a plurality of optical couplers 120 positioned between the input end 102 and the detection end 104 and thus positioned between the photon source 110 and the first photon detector 115a and the second photon detector 115b. The plurality of optical couplers 120 include an initial optical coupler 122 optically coupled to the photon source 110, a final optical coupler 124 optically coupled to the first photon detector 115a and the second photon detector 115b, and one or more intermediate optical couplers 126 positioned between the initial optical coupler 122 and the final optical coupler 124. As used herein, "optically coupled" refers to two or more components arranged such that photons pulses and/or quantum information may be transferred therebetween.

Referring still to FIG. 1, a first input link 130 is optically coupled to and extends between the photon source 110 and the initial optical coupler 122. In operation, a plurality of photons of a photon pulse may be output by the photon source 110 and may travel to the initial optical coupler 122 through the first input link 130. In some embodiments, a second input link 132 is also optically coupled to the initial optical coupler 122. However, the second input link 132 is not optically coupled to the photon source 110 (or to any other photon source). Instead, the second input link 132 comprises a dead end 133 opposite the initial optical coupler 122. In addition, the photon number resolving detector system 100 includes a first output link 134 optically coupled to and extending between the final optical coupler 124 and the first photon detector 115a and a second output link 136 optically coupled to and extending between the final optical coupler 124 and the second photon detector 115b. Further, each of the first input link 130, the second input link 132, the first output link 134 and the second output link 136 comprise an optical waveguide, such as an optical fiber comprising a core and a cladding surrounding the core, a planar waveguide, or the like.

Figure 2:
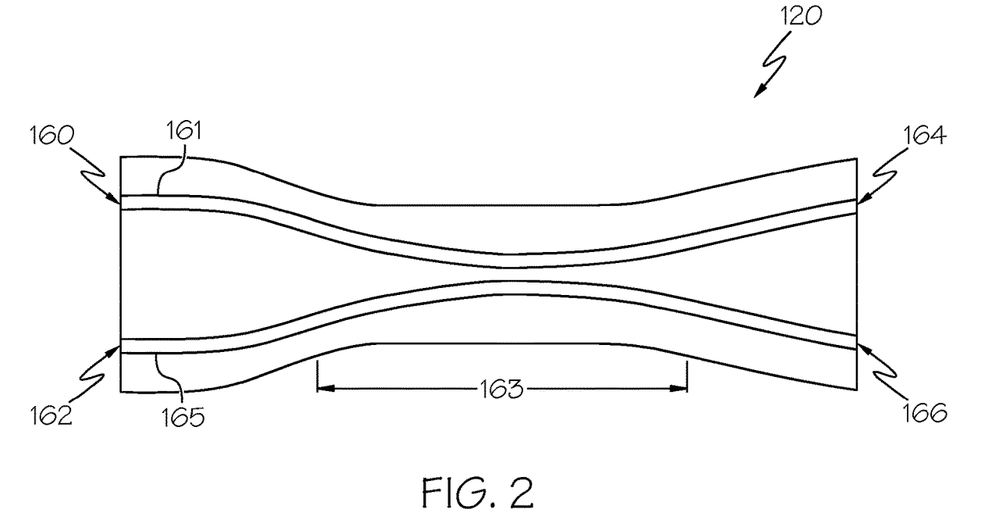
FIG. 2 schematically depicts an example optical coupler of the photon number resolving detector system of FIG. 1, according to one or more embodiments shown and described herein.

Referring now to FIG. 2, an example optical coupler of the plurality of optical couplers 120 is depicted in more detail. As depicted in FIG. 2, each optical coupler 120 comprises a first coupler path 161, a second coupler path 165, and a coupling region 163. The first coupler path 161 extends from a first input 160 to a first output 164 and the second coupler path 165 extends from a second input 162 to a second output 166. In some embodiments, both the first coupler path 161 and the second coupler path 165 comprise optical waveguides, such as an optical fiber comprising a core and a cladding surrounding the core, a planar waveguide, or the like. The coupling region 163 is positioned between the first and second inputs 160, 162 and the first and second outputs 164, 166. The coupling region 163 is a portion of the optical coupler 120 in which the first coupler path 161 and the second coupler path 165 are spaced close enough to one another to induce optical coupling between the first coupler path 161 and the second coupler path 165 in the coupling region 163, for example, evanescent coupling.

In operation, the coupling region 163 directs photons that enter the coupling region 163 to either the first output 164 or the second output 166 based on a coupling ratio of the coupling region 163 (also referred to as the coupling ratio of the optical coupler 120). In some embodiments, the coupling region 163 comprises a 50:50 coupling ratio such that the coupling region 163 directs 50% of photons that enter the coupling region 163 into the first output 164 and 50% of the photons that enter the coupling region 163 into the second output 166. However, it should be understood that the coupling region 163 may comprise other coupling ratios, for example, a range of coupling ratios of from 10:90 to 90:10, such as 20:80, 25:75, 40:60, 45:55, 50:50, 55:45, 60:40, 75:25, 80:20, or the like. Moreover, while not intending to be limited by theory, coupling regions 163 having a 50:50 coupling ratio may minimize the number of optical couplers 120 and dual path spans 140 needed to perform photon number resolving operations using the photon number resolving detector system 100. In some embodiments, the plurality of optical couplers 120 comprise fused fiber optic couplers, in which close spacing may be achieved by twisting the first coupler path 161 and the second coupler path 165 around one another, fusing the first coupler path 161 to the second coupler path 165, or a combination thereof. In some embodiments, the coupling region 163 may include a fiber grating disposed in one or both of the first coupler path 161 or the second coupler path 165 to facilitate optical coupling between the first coupler path 161 and the second coupler path 165.

Figure 3:
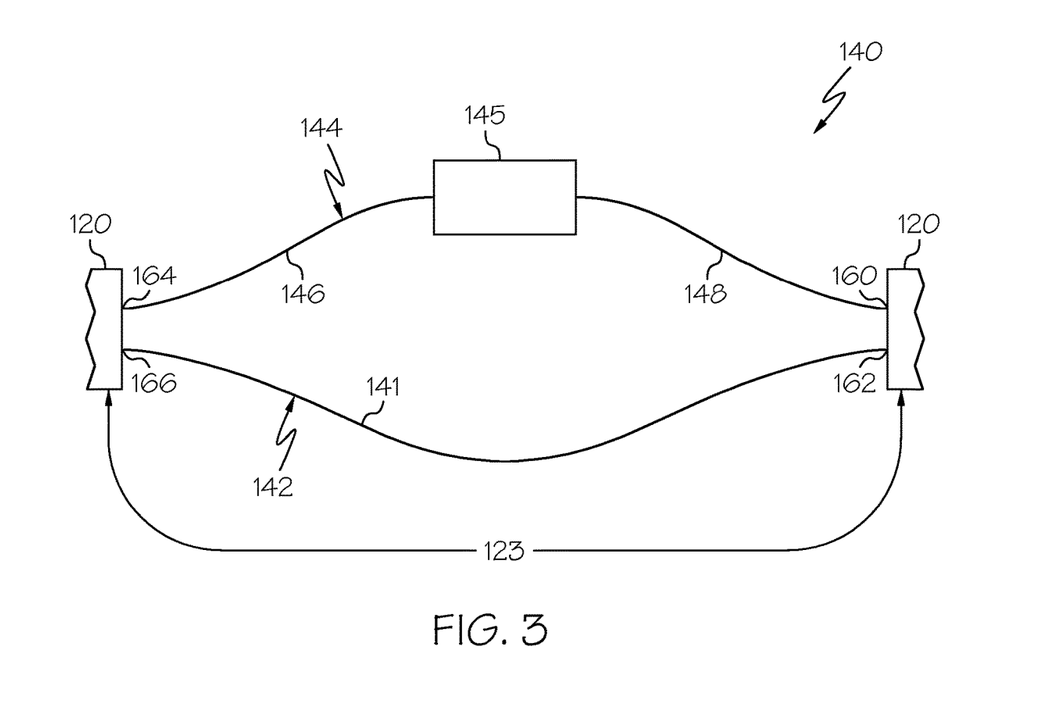
FIG. 3 schematically depicts an example dual path span of the photon number resolving detector system of FIG. 1, according to one or more embodiments shown and described herein.

Referring now to FIGS. 1 and 3, the photon number resolving detector system 100 also comprises a plurality of dual path spans 140, each extending between and optically coupled to adjacent optical couplers 120 (e.g., between a pair 123 of optical couplers 120). The plurality of dual path spans 140 each comprise an undelayed path 142 and a delayed path 144. The undelayed path 142 comprises an undelayed fiber link 141 extending between adjacent optical couplers 120 (e.g., between the pair 123 of optical couplers 120). The delayed path 144 comprises a quantum memory 145 positioned between and optically coupled to an input sub-link 146 and an output sub-link 148. In particular, the input sub-link 146 extends between one optical coupler 120 and the quantum memory 145 and the output sub-link 138 extends between the quantum memory 145 and another optical coupler 120. The undelayed fiber link 141, the input sub-link 146 and the output sub-link 148 each comprise an optical waveguide, such as an optical fiber comprising a core and a cladding surrounding the core, a planar waveguide, or the like. As depicted in FIG. 3, the input sub-link 146 of the delayed path 144 is optically coupled to the first output 164 of one optical coupler 120 and the output sub-link 148 of the delayed path 144 is optically coupled to the first input 160 of another optical coupler 120. Further, the undelayed fiber link 141 of the undelayed path 142 is optically coupled to the second output 166 and is optically coupled to the second input 162 of another optical coupler 120.

In operation, the quantum memory 145 delays photon pulses propagating along the delayed path 144 by a quantum memory period $T_{QM}$. Without intending to be limited by theory, the quantum memory 145 causes delay because, upon receipt of a photon pulse, the quantum memory 145 absorbs the photon pulse via a non-linear optical process thereby exciting an atomic ensemble state of the quantum memory 145 from a first energy state, such as a ground state, into a second energy state, such as a non-ground state, for example, an excited state. As used herein, "atomic ensemble state" refers to the arrangement of energy states of the atoms that comprise the quantum memory 145. As a non-limiting example, in the first energy state, the electrons of the quantum memory 145 may be in a ground state and in the second energy state, some of those electrons may move into an excited state. In some embodiments, the first energy state may have a lower total energy than the second energy state. Then, after a period of time (e.g., the quantum memory period $T_{QM}$), the atomic ensemble state of the quantum memory 145 returns to the first energy state and the photon pulse is released from the quantum memory 145. While not intending to be limited by theory, the atomic ensemble state of the quantum memory 145 may return to the first energy state after a period of time, without an outside stimulus, or upon receipt of an outside stimulus, such as a pump signal received from a pump laser. The photon pulse is then directed from quantum memory 145 into the output sub-link 148 and thereafter into another optical coupler 120.

Still not intending to be limited by theory, while the photon pulse released from the quantum memory 145 is referred to herein as the same photon pulse received by the quantum memory 145, it should be understood that the released photon pulse may be a different photon pulse than the received photon pulse, but comprises the quantum information of the received photon pulse. These are referred to as the same pulse for ease of understanding the operation of the photon number resolving detector system 100. Indeed, photon pulses received by the first and second photon detectors 115a, 115b at the detection end 104 of the photon number resolving detector system 100 comprise the quantum information of corresponding photon pulses output by the photon source 110 at the input end 102. As used herein, "quantum information" refers to information about the photon state, such as one or more measurable quantum properties of the photon, for example, polarization, such as linear polarization, circular polarization, elliptical polarization, or any other polarization, translational momentum, orbital angular momentum, phase, or the like.

The quantum memory 145 of each dual path span 140 may comprise any known or yet to be developed quantum memory, such as a quantum memory based on an atomic frequency comb (AFC) atomic ensemble or a quantum memory based on a controlled reversible inhomogeneous broadening (CRIB) atomic ensemble. Using each of these atomic ensembles, individual photon pulses may be absorbed in such a manner that the quantum information of the received photon pulse is preserved by the atomic ensemble and can be released as a released photon that shares quantum information with a corresponding received photon, for example, some or all of the measurable quantum properties of the corresponding received photon. For example, the released photon may be released upon request (e.g., upon receipt of a pump pulse) or after a set delay.

Some example quantum memories are described in Sangouard et al., "Quantum Repeaters Based on Atomic Ensembles and Linear Optics"; Review of Modern Physics, vol. 83 January-March 2011; pp. 33-80, in which quantum memories are used in quantum repeaters to enable entanglement swapping. Other example quantum memories include the quantum memory systems described in U.S. Pat. Pub. No. 2018/0322921 titled "Quantum Memory Systems and Quantum Repeater Systems Comprising Doped Polycrystalline Ceramic Optical Devices and Methods of Manufacturing the Same," assigned to Corning Incorporated of Corning, N.Y. Yet other example quantum memories may be realized in microwave or radio frequencies (RF), where an electromagnetic field of photons is used as an elemental carrier of information along waveguides (e.g., metallic, superconducting waveguides) that interact with resonators. An example of this approach is described in Moiseev et al., "Broadband Multiresonator Quantum Memory-Interface", Scientific Reports 8:3982 (2018). In addition, this waveguide and resonator approach can be used with photons in the visible and infrared waveguide range.

Referring still to FIGS. 1 and 3, the plurality of dual path spans 140 comprise a first dual path span 140a, a second dual path span 140b, and in some embodiments, additional dual path spans 140. For example, FIG. 1 depicts the first dual path span 140a, the second dual path span 140b, and an $N_{TH}$ dual path span 140n. The $N_{TH}$ dual path span 140n is the dual path span adjacent the final optical coupler 124. For example, in embodiments comprising three dual path spans, the $N_{TH}$ dual path span 140n is a third dual path span and in embodiments comprising nine dual path spans, the $N_{TH}$ dual path span 140n is a ninth dual path span. As depicted in FIG. 1, the plurality of dual path spans 140 are alternately positioned between optical couplers 120. In particular, the first dual path span 140a is positioned between the initial optical coupler 122 and a first intermediate optical coupler 126a and the second dual path span 140b is disposed between the first intermediate optical coupler 126a and a second intermediate optical coupler 126b. Further, the $N_{TH}$ dual path span 140n is positioned between the final optical coupler 124 and an MTH intermediate optical coupler 126m. It should be understood that any number of optical couplers 120 and dual path spans 140 are contemplated. It should further be understood that the photon number resolving detector system 100 comprises one more optical coupler 120 than dual path span 140, in particular, the photon number resolving detector system 100 comprises the initial optical coupler 122, the final optical coupler, an M number of intermediate optical couplers 126, and an N number of dual path spans 140, where M=N–1.

Referring again to FIG. 1, the first dual path span 140a comprises a first quantum memory 145a, the second dual path span 140b comprises a second quantum memory 145b, and the $N_{TH}$ dual path span 140n comprises an $N_{TH}$ quantum memory 145n. Each quantum memory 145 of the plurality of dual path spans 140 comprises a different quantum memory period $T_{QM}$ and increases the temporal spacing between photon pulses of the photon pulse sequence, time multiplexing the photon pulse sequence. The first quantum memory 145a delays photons by a first quantum memory period $T_{QM1}$, the second quantum memory 145b delays photons by a second quantum memory period $T_{QM2}$, and the $N_{TH}$ quantum memory 145n delays photons by an $N_{TH}$ quantum memory period $T_{QMN}$. In particular, the $N_{TH}$ quantum memory period $T_{QMN}=2^{(N-1)}T_{QM1}$. Thus, the second quantum memory period $T_{QM2}=2T_{QM1}$ and in embodiments comprising a third quantum memory and a fourth quantum memory, a third quantum memory $T_{QM3}=4T_{QM1}$ and a fourth quantum period $T_{QM4}=8T_{QM1}$.

Referring again to FIGS. 1-3, the photon number resolving detector system 100 may be used to measure photon pulses of a photon pulse sequence, for example, to count the number of photon pulses in the photon pulse sequence. The photon pulse sequence comprises temporally adjacent photon pulses temporally spaced by a pulse spacing period $T_P$ and the photon number resolving detector system 100 time multiplexes the photon pulses of the photon pulse sequence such that photon pulses received by the first photon detector 115a and the second photon detector 115b are temporally spaced apart by at least a delayed spacing period $T_D$, which is greater than the detector dead time of the first photon detector 115a and the second photon detector 115b.

In some embodiments, a method of counting the photon pulses of the photon pulse sequence the photon number resolving detector system 100 first comprises generating the photon pulse sequence using the photon source 110 and directing the photon pulse sequence from the photon source 110 into the initial optical coupler 122. At the initial optical coupler 122, a first portion of the photon pulse sequence is directed from the initial optical coupler 122 into the undelayed fiber link 141 of the undelayed path 142 of the first dual path span 140a and a second portion of the photon pulse sequence is directed from the initial optical coupler 122 into the input sub-link 146 of the delayed path 144 of the first dual path span 140a. In some embodiments, the first portion and the second portion of the photon pulse sequence each comprise 50% of the photon pulses of the photon pulse sequence, for example, when the initial optical coupler 122 comprises a 50:50 coupling ratio.

In the first dual path span 140a, the first portion of photon pulse sequence propagates through the undelayed fiber link 141 and reaches a first intermediate optical coupler 126a without delay. Meanwhile, the second portion of the photon pulse sequence propagates through the input sub-link 146 of the delayed path 144 into the first quantum memory 145a, which absorbs the second portion of the photon pulse sequence and releases the second portion of photons after the first quantum memory period $T_{QM1}$. Thus, the second portion of the photon pulse sequence reaches the first intermediate optical coupler 126a temporally spaced from the first portion of photons by the first quantum memory period $T_{QM1}$. In other words, the first quantum memory 145a time multiplexes the first portion of photon pulses and the second portion of photons pulse.

Next, at the first intermediate optical coupler 126a, the photon pulses of the photon pulse sequence are recombined such that a different first portion of photon pulses is directed from the first intermediate optical coupler 126a into the undelayed fiber link 141 of the undelayed path 142 of a second dual path span 140b (e.g., a partially or wholly different 50% of the photon pulses than the photon pulses directed into the undelayed path 142 of the first dual path span 140a) and a different second portion of photon pulses is directed from the first intermediate optical coupler 126a into the input sub-link 146 of the delayed path 144 of the second dual path span 140b (e.g., a partially or wholly different 50% of the photon pulses than the photon pulses directed into the delayed path 144 of the first dual path span 140a). In the second dual path span 140b, photon pulses propagate the undelayed fiber link 141 without delay and photon pulses directed into the delayed path 144 are absorbed by the second quantum memory 145b and then released after the second quantum memory period $T_{QM2}$. In other words, the second quantum memory 145b performs additional time multiplexing to some (e.g., half) of the photon pulses of the photon pulse sequence.

The photon pulses of the photon pulse sequence next reach the second intermediate optical coupler 126b where the above described process of recombination (at the second intermediate optical coupler 126b) and time multiplexing (at a subsequent dual path span 140) occurs. This process repeats at each intermediate optical coupler 126 and each dual path span 140 to add additional temporal spacing between photon pulses of the photon pulse sequence. Next, the photon pulse sequence propagates through the $N_{TH}$ dual path span 140n, where the $N_{TH}$ quantum memory 145n delays a portion (e.g., half) of the photon pulses of the photon pulse sequence by the Nth quantum memory period $T_{QMN}$, which equals $2^{(N-1)}T_{QM1}$. After the photon pulses of the photon pulse sequence traverse the Nth dual path span 140n, temporally adjacent photon pulses of the photon pulse sequence are spaced apart by at least the delayed spacing period $T_D$. While not intending to be limited by theory, after N dual path spans 140, the first and last photon pulse of the photon pulse sequence are temporally separated by $2^N(T_D)$. While still not intending to be limited by theory, after N dual path spans 140, some temporally adjacent photon pulses may be spaced apart by greater than the delayed spacing period $T_D$ due to the presence of empty pulses, for example, as described in U.S. Pat. Pub. No. 2018/0331826 titled "Methods and Systems for Empty Pulse Mitigation in Quantum Key Distribution Systems Using Entangled Photons", assigned to Corning Incorporated of Corning, N.Y.

After the photon pulse sequence traverses the $N_{TH}$ dual path span 140n, the method further comprises receiving the plurality of photons of the photon pulse sequence at the final optical coupler 124. The final optical coupler 124 directs a portion (e.g., 50%) of the photon pulse sequence into the first output link 134 such that these photons reach the first photon detector 115a and directs another portion (e.g., 50%) of the photon pulse sequence into the second output link 136 such that these photons reach the second photon detector 115b. Finally, the first photon detector 115a and the second photon detector 115 count each photon pulse they receive. Because adjacent photons received by the final optical coupler 124 are spaced apart by at least the delayed spacing period $T_D$, the first photon detector 115a and the second photon detector 115b receive photons temporally spaced by at least the delayed spacing period $T_D$. As noted above, the delayed spacing period $T_D$ is greater than the detector dead time of the first photon detector 115a and the second photon detector 115b such that first photon detector 115a and the second photon detector 115b can count the total number of photons in the photon pulse sequence without detector dead time interference.

When the first quantum memory period $T_{QM1}$ is greater than or equal to the detector dead period of the first photon detector 115a and the second photon detector 115b and the photon number resolving detector system 100 comprises a sufficient number N of dual path spans 140, the delayed spacing period $T_D$ between temporally adjacent photons is greater than the detector dead time of the first and second photon detectors 115a, 115b. While not intending to be limited by theory, the number of dual path spans 140 in the photon number resolving detector system 100 and the quantum memory period $T_{QM}$ of the quantum memory 145 of each dual path span 140 depends on the ratio the expected number of photon pulses to be detected/resolved in the photon pulse sequence and the detector dead time of the first and second photon detectors 115a, 115b. In particular, the first quantum memory period $T_{QM1}$ should be greater than or equal to the detector dead time and an N number of dual path spans 140 should be used where $2^N$ is the expected number of photon pulses to be detected/resolved in the photon pulse sequence.

Because the dual path spans 140 do not rely on increasing lengths of optical fiber to perform time multiplexing, an increased number of dual path spans 140 may be used when compared to fiber length based time multiplexing detectors, thus facilitating the measurement/resolution of larger numbers of photon pulses (e.g., a higher photon number of photons). Indeed, the number of dual path spans 140 is merely limited by the maximum achievable quantum memory period. As one example, when quantum memories having a maximum achievable quantum memory period of 36 ms are used, the maximum number of dual path spans 140 is 17 (i.e., N=17) and thus a photon pulse sequence having $2^{17}$ photon pulses may be resolved. As another example, when quantum memories having a maximum achievable quantum memory period of 10 ms are used, the maximum number of dual path spans 140 is 15 (i.e., N=15) and thus a photon pulse sequence having $2^{15}$ photon pulses may be resolved. As yet another example, when quantum memories having a maximum achievable quantum memory period of 64 µs are used, the maximum number of dual path spans 140 is 9 (i.e., N=9) and thus a photon pulse sequence having $2^9$ photon pulses may be resolved.

Furthermore, because the dual path spans 140 do not rely on increasing lengths of optical fiber to perform time multiplexing, the dual path spans 140 do not suffer the same attenuation penalties when compared to fiber length based time multiplexing detectors. As a comparative example, when using a fiber length based time multiplexing detector scheme with a detector dead time of 125 ns, the minimal delay (i.e., the delay at the first stage) is 125 ns and thus the first stage would need a fiber length of 25 m. Further, if 10 delay stages were needed to resolve the photon pulse sequence, the final stage would need a fiber length of 50 km (i.e., $2^{10}*25$ m). At these lengths, the attenuation loss for a photon pulse sequence having a 1550 nm wavelength will be about 7-8 dB, which about a 16-20% transmission rate.

In contrast, the photon number resolving detector system 100 described herein may count the photon pulses of the photon pulse sequence using photon detectors 115a, 115b at higher transmission rates and thus, the photon number resolving detector system 100 can count photons with photon detectors 115a, 115b having increased detector dead times. As described above, the first quantum memory period $T_{QM1}$ is, at minimum, equal to the detector dead time. Thus, increased detector dead times requires increased first quantum memory periods $T_{QM1}$, which in turn increases each quantum memory period of the quantum memories 145 of subsequent dual path spans 140. As a non-limiting example, when the first quantum memory period $T_{QM1}$ is 10 ms, the transmission rate of the photon number resolving detector system 100 is about 50% and when the first quantum memory period $T_{QM1}$ is 128 µs, the transmission rate of the photon number resolving detector system 100 increases to greater than 99%. Conversely, when a first delay stage achieves a 128 µs delay in a fiber length based time multiplexing scheme, this corresponds to a final delay stage having a fiber length of about 50 km resulting in a 16-20% transmission rate.

In view of the foregoing description, it should be understood that photon number resolving detector systems may include a plurality of optical couplers and a plurality of dual path spans alternately positioned between a photon source and two photon detectors. The plurality of dual path spans include an undelayed path having an undelayed fiber link extending between two optical couplers and a delayed path that includes a quantum memory, which delay photon pulses and facilitates time-division multiplexing without the need for increased optical fiber lengths. This reduction of optical fiber lengths reduces photon attenuation, increases the efficiency of the photon number resolving detector system, and reduces the overall size of the photon number resolving detector system.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A photon number resolving detector system comprising:
    a photon source positioned at an input end;
    a first photon detector and a second photon detector each positioned at a detection end and each comprising a detector dead period;
    a plurality of optical couplers positioned between the input end and the detection end, wherein the plurality of optical couplers comprise an initial optical coupler optically coupled to the photon source, a final optical coupler optically coupled to the first photon detector and the second photon detector, and one or more intermediate optical couplers positioned between the initial optical coupler and the final optical coupler;
    a first input link optically coupled to and extending between the photon source and the initial optical coupler; and
    a plurality of dual path spans extending between and optically coupled to adjacent optical couplers, wherein the plurality of dual path spans each comprise:
        an undelayed path comprising an undelayed fiber link; and
        a delayed path comprising a quantum memory positioned between and optically coupled to an input sub-link and an output sub-link, wherein each quantum memory comprises a quantum memory period greater than or equal to the detector dead period;
        wherein each quantum memory of the plurality of dual path spans comprises a different quantum memory period.

2. The photon number resolving detector system of claim 1, wherein the plurality of optical couplers comprise fused fiber optic couplers.

3. The photon number resolving detector system of claim 1, further comprising:
    a first output link optically coupled to and extending between the final optical coupler and the first photon detector; and
    a second output link optically coupled to and extending between the final optical coupler and the second photon detector.

4. The photon number resolving detector system of claim 3, wherein the first input link, the first output link, the second output link and the undelayed fiber link, the input sub-link, and the output sub-link of each of the plurality of dual path spans comprise optical fibers.

5. The photon number resolving detector system of claim 1, wherein the plurality of optical couplers each comprise a 50:50 coupling ratio.

6. The photon number resolving detector system of claim 1, wherein the first photon detector and the second photon detector each comprise a single photon detector.

7. The photon number resolving detector system of claim 6, wherein the single photon detector comprises a superconducting nanowire single-photon detector, a carbon nanowire detector, an avalanche photodiode detector, or a low dark count photodiode.

8. The photon number resolving detector system of claim 1, further comprising a second input link optically coupled to the initial optical coupler, wherein the second input link comprises a dead end opposite the initial optical coupler.

9. A method of counting photons of a photon pulse, the method comprising:
    directing a photon pulse sequence comprising a plurality of photon pulses from a photon source into an initial optical coupler, wherein:
        the initial optical coupler is optically coupled to a first dual path span of a plurality of dual path spans;
        the plurality of dual path spans each comprise an undelayed path having an undelayed fiber link and a delayed path comprising a quantum memory positioned between and optically coupled to an input sub-link and an output sub-link; and
        the initial optical coupler directs a first portion of photon pulses of the photon pulse sequence into the undelayed fiber link and directs a second portion of photon pulses of the photon pulse sequence into the input sub-link of the delayed path;
    delaying the second portion of photon pulses using the quantum memory of the first dual path span, wherein the quantum memory of the first dual path span comprises a quantum memory period;
    receiving the plurality of photon pulses of the photon pulse sequence at a final optical coupler optically coupled to a first photon detector and a second photon detector such that the final optical coupler directs each of the plurality of photon pulses of the photon pulse sequence toward the first photon detector or the second photon detector; and
    counting each photon received by the first photon detector and the second photon detector, wherein:
        the first photon detector and the second photon detector each comprise a detector dead time;
        temporally adjacent photons received by the first photon detector are spaced apart by at least a delayed spacing period;
        temporally adjacent photons received by the second photon detector are spaced apart by at least the delayed spacing period; and
        the delayed spacing period is greater than the detector dead time and greater than or equal to the quantum memory period of the quantum memory of the first dual path span.

10. The method of claim 9, wherein a first input link extends between the photon source and the initial optical coupler such that the photon pulse sequence is directed from the photon source through the first input link and into the initial optical coupler.

11. The method of claim 10, wherein a second input link is optically coupled to the initial optical coupler and comprises a dead end opposite the initial optical coupler.

12. The method of claim 9, wherein a first output link extends between the final optical coupler and the first photon detector and a second output link extends between the final optical coupler and the second photon detector.

13. The method of claim 9, wherein the initial optical coupler and the final optical coupler each comprise a 50:50 coupling ratio.

14. The method of claim 9, wherein delaying the second portion of photon pulses using the quantum memory comprises absorbing the second portion of photon pulses using the quantum memory, thereby exciting an atomic ensemble state of the quantum memory from a first energy state into a second energy state and, upon return of the atomic ensemble state of the quantum memory to the first energy state, releasing, from the quantum memory, the second portion of photon pulses.

15. The method of claim 9, wherein:
the initial optical coupler and the final optical coupler are two of a plurality of optical couplers, the plurality of optical couplers further comprising one or more intermediate optical couplers positioned between the initial optical coupler and the final optical coupler; and
the plurality of dual path spans are alternately positioned between the plurality of optical couplers such that each dual path span extends between and is optically coupled to two optical couplers of the plurality of optical couplers.

16. The method of claim 15, wherein:
the first dual path span is positioned between and optically coupled to the initial optical coupler and a first intermediate optical coupler and the quantum memory of the first dual path span comprises a first quantum memory;
a second dual path span is positioned between and optically coupled to the first intermediate optical coupler and a second intermediate optical coupler and comprises a second quantum memory; and
an $N_{TH}$ dual path span is positioned between and optically coupled to an additional optical coupler and the final optical coupler and comprises an $N_{TH}$ quantum memory.

17. The method of claim 16, further comprising delaying photons a quantum memory period at each of the plurality of dual path spans.

18. The method of claim 17, wherein the first quantum memory comprises a quantum memory period $T_{QM1}$, the second quantum memory comprises a second quantum memory period $T_{QM2}$, the $N_{TH}$ quantum memory comprises an $N_{TH}$ quantum memory period $T_{QMN}$, $T_{QM2}=2T_{QM1}$, and $T_{QMN}=2^{(N-1)}T_{QM1}$.

* * * * *